United States Patent [19]

Alferink et al.

[11] Patent Number: 5,719,243
[45] Date of Patent: Feb. 17, 1998

[54] USE OF PEROXYACIDS AS MOLECULAR WEIGHT REGULATORS

[75] Inventors: Petrus Johannes Theodorus Alferink, Westervoort; Hans Westmijze, Bathmen; John Meijer, Deventer, all of Netherlands

[73] Assignee: Akzo Nobel NV, Arnhem, Netherlands

[21] Appl. No.: 732,366

[22] PCT Filed: May 3, 1995

[86] PCT No.: PCT/EP95/01679

§ 371 Date: Oct. 25, 1996

§ 102(e) Date: Oct. 25, 1996

[87] PCT Pub. No.: WO95/30697

PCT Pub. Date: Nov. 16, 1995

[30] Foreign Application Priority Data

May 6, 1994 [EP] European Pat. Off. ............. 94201274

[51] Int. Cl.$^6$ .................................................. C08F 4/28
[52] U.S. Cl. ................................. 526/227; 526/344.2
[58] Field of Search ......................................... 526/227

[56] References Cited

U.S. PATENT DOCUMENTS

| | | | |
|---|---|---|---|
| 2,813,885 | 11/1957 | Swern et al. ........................ | 260/406 |
| 3,219,588 | 11/1965 | La Combe et al. .................. | 526/227 |
| 3,373,150 | 3/1968 | Pears et al. ........................ | 526/227 |
| 3,523,111 | 8/1970 | Bibeau et al. ...................... | 260/92.8 |
| 3,957,744 | 5/1976 | Deuschel et al. ................... | 526/227 |
| 3,959,235 | 5/1976 | Nishigaki et al. .................. | 526/227 |
| 4,005,249 | 1/1977 | Peterson et al. ................... | 526/227 |
| 4,866,146 | 9/1989 | Janda et al. ....................... | 526/213 |

FOREIGN PATENT DOCUMENTS

| | | | |
|---|---|---|---|
| 2086635 | 12/1971 | France ............................... | C08F 1/00 |
| 1927761 | 12/1970 | Germany ............................ | 526/227 |
| 2 006 966 | 8/1971 | Germany . | |
| 60-104104 | 6/1985 | Japan ................................. | 526/227 |
| 924645 | 4/1963 | United Kingdom ................. | 526/227 |
| 937215 | 9/1963 | United Kingdom ................. | 526/227 |
| 1174877 | 12/1969 | United Kingdom ................. | C08F 1/62 |
| WO 91/07440 | 5/1991 | WIPO .................................. | C98F 2/38 |
| WO 92/06953 | 4/1992 | WIPO .................................. | C07C 409/20 |
| WO 94/13705 | 6/1994 | WIPO .................................. | C08F 2/38 |

OTHER PUBLICATIONS

*Organic Peroxides,* vol. 1, pp. 59–61 and 313–317.
*High Temperature Polymerization And The Use,* 1993, pp. 2–17.
*Description of Invention,* RU 2,140,318, dated Aug. 30, 1978.
*Abstract,* JP 254464.

Primary Examiner—Joseph L. Schofer
Assistant Examiner—N. Sarofim
Attorney, Agent, or Firm—Ralph J. Mancini; Louis A. Morris

[57] ABSTRACT

A method of radically (co)polymerizing vinyl ester, vinyl halide, diene, acrylonitrile and α-olefin monomers, optionally with one or more ethylenically unsaturated monomers, with a polymerization initiator in the presence of an amount of at least one peroxyacid chain transfer agent effective to reduce the molecular weight of the (co)polymer in comparison to a (co)polymer made by the same process without chain transfer agent, is disclosed. Also disclosed are (co)polymers produced by the method and the use of particular peroxyacids as chain transfer agents in the radical polymerization of one or more ethylenically unsaturated monomers. These peroxyacids give a significant molecular weight reduction, and are useful with a variety of different polymerization initiators.

10 Claims, No Drawings

USE OF PEROXYACIDS AS MOLECULAR WEIGHT REGULATORS

The present invention relates to a method of radically (co)polymerizing vinyl ester, vinyl halide, diene, acrylonitrile and α-olefin monomers, optionally with one or more ethylenically unsaturated monomers, in the presence of a peroxyacid chain transfer agent to thereby control the molecular weight of the resulting (co)polymer, to (co)polymers produced by this method and to the use of peroxyacids as molecular weight regulating agents in the polymerization of these monomers.

The general concept of employing a molecular weight regulating agent, also known as a chain transfer agent, as an additive during polymerization reactions has been known for a long time. However, these chain transfer agents suffer from several disadvantages. For example, they often retard the polymerization reaction. Further, many chain transfer agents contain mercaptan or other sulfur-containing functional groups making their use and handling undesirable due to safety and environmental concerns. Finally, many chain transfer agents only function well in a particular reaction and cannot be used for other polymerization reactions or with a variety of different initiators.

In the (co)polymerization of vinyl chloride monomers, it is often desirable to obtain lower molecular weight products. This can be achieved either by polymerization at high temperature and pressure or by the use of a chain transfer agent. The first alternative is often undesirable since it places special demands on the reactor and the type and amount of polymerization initiator to be employed.

The second alternative, use of a chain transfer agent selected from 2-mercaptoethanol, 2-ethylhexylthioglycolate and 2-ethylhexanal suffers from the disadvantages that the polymerization reaction is significantly retarded by these chain transfer agents, and some of these materials are undesirable for safety and environmental reasons.

It is the object of the present invention to overcome these disadvantages of known chain transfer agents by providing peroxyacid chain transfer agents which are not based on undesirable sulfur-containing groups and which do not or not substantially retard the polymerization reaction, but rather, may even accelerate the polymerization reaction. These and other objects of the present invention will be apparent from the summary and detailed description which follow.

In a first aspect, the present invention relates to a method of radically (co)polymerizing vinyl ester, vinyl halide, diene, acrylonitrile and α-olefin monomers, optionally with one or more ethylenically unsaturated monomers, using a polymerization initiator in the presence of an amount of at least one peroxyacid chain transfer agent effective to reduce the molecular weight of the (co)polymer in comparison to a (co)polymer made by the same process without chain transfer agent. The peroxyacid chain transfer agent used in the method of the present invention is selected from the group of compounds which contain the moiety of the formula I:

More particularly, the preferred peroxyacids useful in the process of the present invention are selected from the group represented by the following formulae:

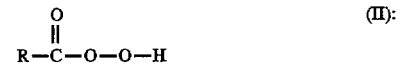

wherein R is selected from the group consisting of H, $CH_3$, $C(O)OOH$, $C(O)OH$, $C(O)OCH_3$, $C(O)OR_1$, $C_2$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, wherein the alkyl groups may be linear or branched and wherein the alkyl, cycloalkyl, aryl, aralkyl and alkaryl groups are optionally substituted with one or more groups Y, wherein Y is a group selected from —$C(O)OOH$, hydroxy, alkoxy, aryloxy, epoxy, halogen, —$C(O)OR_1$, —$OC(O)R_1$, —$C(O)OH$, nitrile, nitro, —$C(O)NR_1R_2$, —$C(O)NHR_1$, —$C(O)NH_2$, —$N(R_1)C(O)R_2$, —$SO_2NR_1R_2$, —$SO_2NHR_1$, —$SO_2NH_2$, and —$N(R_1)SO_2R_2$; wherein $R_1$ and $R_2$ are independently selected from the group consisting of $C_2$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, wherein the alkyl groups may be linear or branched; and

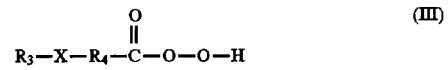

wherein $R_3$ is selected from the group consisting of, hydrogen, $C_1$–$C_{20}$ alkyl, $C_3$–$C_{20}$ cycloalkyl, $C_6$–$C_{20}$ aryl, $C_7$–$C_{20}$ aralkyl, $C_7$–$C_{20}$ alkaryl and imido-group containing radicals, wherein the alkyl groups may be linear or branched; $R_4$ is selected from $C_1$–$C_{20}$ alkylene, $C_2$–$C_{20}$ alkenylene, $C_6$–$C_{20}$ arylene, $C_7$–$C_{20}$ alkylene, $C_7$–$C_{20}$ alkarylene, $C_3$–$C_{20}$ cycloalkylene and $C_3$–$C_{20}$ cycloalkenylene, wherein the alkylene and alkenylene groups may be linear or branched; and $R_3$ and/or $R_4$ are optionally substituted with one or more groups Y as defined above; and X is selected from covalent bond, —$SO_2$—, —$N(R_5)C(O)$—, —$C(O)N(R_5)$—, —$C(O)N[C(O)(R_5)]$—, and —$NHC(O)N(H)$—; wherein $R_5$ is selected from the group consisting of $C_2$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, wherein the alkyl groups may be linear or branched and are optionally substituted with one or more groups Y as defined above; an $R_3$ an $R_5$ can combine to form a ring containing substituent selected from cycloalkyl, aryl, aralkyl or alkaryl, which ring is optionally substituted with one or more groups Y as defined above.

The present invention also relates to (co)polymers produced by this (co)polymerization method. In a third aspect, the present invention relates to the use of at least one peroxyacid of the formulae II and III as a chain transfer agent in the radical polymerization of one or more ethylenically unsaturated monomers.

From U.S. Pat. No. 2,813,885, it is apparent that peroxyacids are known compounds and have been used, for example, as polymerization initiators for free-radical polymerization reactions such as the polymerization of vinyl monomers. In addition, it is known from Soviet Inventor's Certificate 2,140,318 that fatty acid peroxides made from a $C_3$–$C_{12}$ fatty acid fraction can be employed as a polymerization initiator and that these peroxides have a molecular weight regulating effect. However, this teaching differs from the present invention since no separate polymerization initiator is employed and it is not certain that the fatty acid peroxides are, in fact, the peroxyacids used in the process as claimed in the present application.

Non-prepublished International patent application number PCT/EP93/03323 also discloses the use of particular unsaturated peroxyacids as chain transfer agents. However, these unsaturated compounds are outside the scope of the present application. Finally, peroxyacids are also known to be useful as polymerization initiators for acrylate polymerization at 130°–140° C. from, for example, U.S. Pat. No. 4,866,146. However, this patent application does not teach the use of peroxyacids as chain transfer agents.

Accordingly, the present invention provides a novel process for the (co)polymerization of vinyl ester, vinyl halide, diene, acrylonitrile and α-olefin monomers, optionally with one or more ethylenically unsaturated monomers, whereby lower molecular weight polymers can be attained without the attendant disadvantages of having to conduct the polymerization reaction at high temperatures and pressures or having to use a chain transfer agent which significantly retards the polymerization and/or contains undesirable sulfur groups. For the purpose of the present application, the term, "(co)polymer" should be understood to mean, "polymers and/or copolymers."

The peroxyacids of the present invention may be prepared by one or more of the preparation methods for peroxyacids which are well known to those of skill in the art. For example, in many cases the preparation can be accomplished by treating the corresponding carboxylic acid with hydrogen peroxide. Other synthesis routes can be found in, for example, *Organic Peroxides*, Daniel Swern, Editor, John Wiley & Sons, Inc., New York (1970).

In a preferred embodiment of the present invention, the peroxyacids of the formulas II–III are limited to those where R is selected from $C_3$–$C_{20}$ alkyl, $C_5$–$C_{20}$ cycloalkyl, $C_7$–$C_{20}$ aralkyl and $C_7$–$C_{20}$ alkaryl, all of which groups may be linear or branched, and where $R_4$ is $C_1$–$C_{20}$ alkylene, $C_5$–$C_{20}$ cycloalkylene, $C_6$–$C_{20}$ arylene, $C_7$–$C_{20}$ aralkylene, $C_7$–$C_{20}$ alkarylene and $C_3$–$C_{20}$ cycloalkenylene, X is nothing or sulfone and $R_3$ is an amido-group containing radical. Typical amido-group containing radicals which are preferred for the present invention are optionally substituted phthalimido including tetrahydrophthalimido and hexahydrophthalimido, succinimido, maleimido, citraconimido and itaconimido radicals.

More preferably, the present peroxyacid chain transfer agents are substantially oil soluble such that they will dissolve in the monomer phase of suspension or emulsion polymerization media. Most preferably, the peroxyacids of the present invention are also storage stable at temperatures of up to 40° C.

The groups R, $R_3$ and $R_4$ may be selected on the basis of their influence on the chain transfer coefficient of the peroxyacid, for their effect on the oil-solubility of the peroxyacid, or to provide a more storage stable peroxyacid, depending upon the particular (co)polymerization method which will be employed. In this regard, R, $R_3$ and $R_4$ groups containing longer chain ($C_{10}$–$C_{20}$) alkyl groups are preferred due to the positive influence of such long alkyl groups on the oil-solubility and storage stability of the peroxyacids.

The peroxyacids of the present invention may be prepared, transported, stored and applied as such, or in the form of powders, granules, pastes, solutions, suspensions, emulsions, or in any other known physical form. Which of these physical forms is preferred will depend upon the particular (co)polymerization reaction, as well as other conditions of transport, storage and use.

The process of the present invention may be operated in the same manner and under essentially the same conditions as conventional processes employing known chain transfer agents such as 2-mercaptoethanol and 2-ethylhexanal. Further information regarding the conventional processes can be found, for example, in the paper, "High Temperature Polymerization and the Use of Chain Transfer Agents in Low Molecular Weight PVC Manufacture," Hirose, Y. and Westmijze, H., PVC Seminar 1993 presented by Kayaku Akzo Corporation, as well as in Canadian patent application number 2,077,397. The present process is particularly suited for the (co)polymerization of vinyl chloride monomers to obtain low molecular weight polymers useful in bottles and special injection-molded articles.

Also within the scope of the present invention are redox polymerization reactions such as are described in French Patent publication 2,086,635; and German Patent publications 1,915,537 and 2,006,966. Typically, such a polymerization reaction is carried out in the presence of a reduction agent in an emulsion of the polymerizable monomer.

The peroxyacids used in the process of the present invention exhibit several advantages. First, these materials exhibit an unexpectedly good ability to control and lower the molecular weights of products of standard polymerization processes. Further, the severe retardation of the polymerization reaction which is often observed when a conventional chain transfer agent is employed does not occur when the present peroxyacids are employed. In fact, some of the preferred peroxyacids actually accelerate the polymerization reaction. Third, the present chain transfer agents contain no undesirable sulfur-containing groups such as mercaptans.

Additionally, the present chain transfer agents do not reduce monomer conversion. Finally, in some reactions the present peroxyacids provide the further benefit that the amount of polymerization initiator required for the reaction can be reduced when used in combination with the peroxyacid. This further advantage results from the fact that the peroxyacid, under certain conditions, can function both as a chain transfer agent and, to some extent, an initiator.

The present process is similar to conventional (co)polymerization processes except that the process is carried out in the presence of one or more peroxyacid chain transfer agents which is used in addition to the standard polymerization initiator. The amount of, and the type of peroxyacid may be chosen depending upon the reaction temperature, the monomers to be polymerized, the polymerization initiator employed and the degree of reduction of the molecular weight that is desired. In general, the process of the present invention comprises the use of any amount of peroxyacid which reduces the molecular weight of the resultant (co)polymer in comparison to a (co)polymer made by an identical process in the absence of a chain transfer agent.

Typically, from 0.001 to 30 weight percent, based on the weight of the monomers, of peroxyacid chain transfer agent, is employed. More preferably, from 0.01 to 5.0% by weight of the peroxyacid is employed, and most preferably, from 0.02 to 2.0% of peroxyacid is used. Mixtures of two or more chain transfer agents may also be employed within the scope of the present invention.

It is preferred to choose a chain transfer agent which has a decomposition temperature which is above the polymerization temperature since significant decomposition of the chain transfer agent generally leads to a reduction in the chain transfer activity. However, this need not always be the case. For example, it may be desirable to employ the peroxyacids of the present invention for the dual purpose of chain transfer agent and free radical initiator in which case some decomposition of the peroxyacid during the polymerization reaction will be desirable.

The polymerizable monomers useful in the process of the present invention are vinyl ester, vinyl halide, diene, acrylonitrile and α-olefin monomers, which may optionally be copolymerized with one or more ethylenically unsaturated monomers. The monomers should not be readily epoxidizeable under the polymerization conditions. Preferred monomers are vinyl chloride, vinylidene chloride, vinyl fluoride or vinylidene fluoride. The comonomers may preferably be selected from acrylates, methacrylates, styrene, styrene derivatives, vinyl esters, vinyl halides, dienes, acrylonitrile and α-olefins. Preferably, the comonomers are not readily epoxidizeable under standard polymerization conditions.

As the polymerization initiator may be used conventional polymerization initiators which are well-known in the art. The preferred polymerization initiator for a particular reaction will depend on the monomers to be polymerized and the reaction temperature to be employed. The preferred initiators for use in the present invention are peroxyesters, peroxydicarbonates, diacyl peroxides and azo initiators.

The present invention also relates to (co)polymers and oligomers produced by the process of the present invention. Furthermore, the present invention also includes articles of manufacture which comprise one or more (co)polymers made in accordance with the process of the present invention. The articles of manufacture may be, for example, bottles or injection molded articles. Finally, the present invention also relates to the use of peroxyacids as a chain transfer agent in radical polymerization processes.

The following examples are presented to further illustrate the present invention.

EXAMPLES 1–10 AND COMPARATIVE EXAMPLES A–G

Polyvinyl alcohol (0.39 g. Gohsenol® KP-08 ex. Nippon Gohsei) was dissolved in 520 g of water in a one liter Büchi stainless steel autoclave with a 3-bladed stirrer with baffle (735 r.p.m.) and a temperature controller. To this solution was added a phosphate buffer system comprised of 0.2 g. $Na_2HPO_4$ and 0.2 g. of $NaH_2PO_4$, the amount and type of chain transfer agent given in Table 1 and 0.573 g of the polymerization initiator bis(3,5,5-trimethylhexanoyl) peroxide (assay 90.8%).

The reactor was then evacuated and flushed twice with nitrogen. After addition of 260 g. of vinyl chloride monomer, the reactor was heated to the reaction temperature of 62° C. over a period of 60 minutes and held at that temperature for 6 hours. Then, the remaining vinyl chloride monomer was vented and the polyvinyl chloride was filtered, washed with water and dried overnight at 50° C. in an air-oven.

The polyvinyl chloride was then analyzed for conversion of vinyl chloride monomer on a weight basis. In addition, the mean particle size was determined using a Coulter Counter Multisizer, the bulk density and dry flow were determined by using an Erichsen Din Cup 243/11.8 according to ASTM D1895. The molecular weights are given as K-values which were measured according to DIN norm 53726. The results are given in Table 1. In the Tables, C.P.T. stands for Constant Pressure Time.

TABLE 1

1 liter scale Chain Transfer Agent (C.T.A.)-experiments at 62° C.
Initiator: bis(3,5,5-trimethylhexanoyl)peroxide (0.200%) on Vinyl Chloride Monomer

| C.T.A. | Example number | concentration (%) | conc, A.O. ($10^{-2}$%) | conversion (%) | C.P.T. (min) | Mean rate of pressure-drop (bar/hr) | Bulk density (gr/cm$^3$) | M.P.S. (μm) ( ... ) = d 95 | K-value |
|---|---|---|---|---|---|---|---|---|---|
| None | A | — | — | 92.4 | 200 | 3.4 | 0.46 | 154 (225) | 63 |
| 2-Ethylhexanal | B | 0.250 | — | 87.1 | 275 | 2.2 | 0.44 | 148 (221) | 57.7 |
| mono-t-butylperoxy maleate | C | 0.200 | 1.702 | 55.6 | 23(hr) | 0 | 0.45 | 136 (222) | 55.9 |
| 1-tert-Butyl-peroxy-2-phenyl 2-propene | D | 0.200 | 1.553 | 86.8 | 365 | 1.0 | 0.58 | — | 59.4 |
| Lauricacid | E | 0.930 | — | 93.8 | 201 | 3.8 | 0.49 | 196 (290) | 62.0 |
| 4-Hydroperoxy-2-methoxy-pentane | F | 0.150 | 1.791 | 86.4 | 325 | 2.8 | 0.46 | 156 (232) | 61.4 |
| Perlauricacid | 1a | 1.000 | 7.407 | 93.9 | 163 | 3.0 | 0.39 | 139 (221) | 46.8 |
| Perlauricacid | 1b | 0.500 | 3.704 | 92.8 | 174 | 3.1 | 0.42 | 148 (215) | 52.9 |
| Perlauricacid | 1c | 0.250 | 1.852 | 92.7 | 184 | 2.9 | 0.45 | 154 (222) | 57.2 |
| 2-Ethylperhexanoic-acid | 2 | 0.500 | 5.000 | 92.8 | 140 | 5.9 | 0.44 | 149 (228) | 49.1 |
| Nonyl Amido Peroxy Adipic Acid | 3 | 0.500 | 2.788 | 91.5 | 180 | 1.2 | 0.40 | 146 (254) | 55.2 |
| Dodecane-di(peracid) | 4 | 0.200 | 2.735 | 92.5 | 180 | 3.0 | 0.43 | 151 (217) | 58.2 |
| 2-n-Octanesulfonyl-peraceticacid | 5 | 0.300 | 1.905 | 91.2 | 207 | 2.0 | 0.42 | 149 (219) | 60.4 |
| 3-n-Decanesulfonyl-perpropionic acid | 6 | 0.200 | 1.633 | 91.7 | 219 | 3.2 | 0.40 | 157 (351) | 60.1 |
| n-Decylbutane-diperacid | 7 | 0.300 | 1.655 | 86.7 | 154 | (Sep.)* | 0.35 | 137 (183) | 60.4 |
| Peraceticacid | 8a | 0.100 | 2.105 | 91.2 | 208 | 1.3 | 0.43 | 157 (242) | 61.4 |
| Peraceticacid | 8b | 0.400 | 8.400 | 90.3 | 222 | 5.9 | 0.43 | 154 | 59.3 |
| Perhexanoic acid | 9 | 0.300 | 3.600 | 90.7 | 205 | 6.3 | 0.40 | 153 | 53.0 |
| Performic acid | 10 | 0.300 | 7.520 | 88.1 | 218 | 4.8 | 0.39 | 161 | 61.2 |
| Formic acid | G | 0.250 | — | 90.6 | 210 | 8.4 | 0.44 | 149 | 62.0 |

A.O. = Active Oxygen
M.P.S. = Mean Particle Size
*phase separation at pressure drop These examples demonstrate that chain transfer agents of the present invention lower the molecular weight of the resultant polymer in comparison to the control (Examples A, E and G). In addition, the polymerization time is significantly longer for prior art chain transfer agents than for the chain transfer agents of the present invention which, in most cases showed the same or a faster polymerization time than the control example. Also shown in Table 1 is that the chain transfer agents of the present invention have little influence on the mean particle size, such that a polymer of good quality and low molecular weight can be produced using the chain transfer agents of the present invention.

EXAMPLE 11 AND COMPARATIVE EXAMPLES H-K

The same recipe and procedure was used for these examples as for Examples 1-10 except that several different, commercially available chain transfer agents were compared to a chain transfer agent in accordance with the present invention. The results are given in Table 2.

transfer agent of the present invention rather than the commercially available PVC chain transfer agents currently in use.

EXAMPLES 12-14 AND COMPARATIVE EXAMPLES L-N

The same procedure was employed for these examples as for the previous examples except that the polymerization initiator was varied in order to demonstrate that the chain transfer agent of the present invention works with several different polymerization initiators. The concentration of the initiator and CTA is expressed as weight percent on VCM. The results are given in Table 3.

TABLE 2

Kinetic influence of the application of different CTA's at 62° C. using bis(3,5,5-trimethylhexanoyl)peroxide (0.20% on VCM) as initiator.

| CTA | Example number | concentration (%) | conversion (by weight) (%) | conversion (%) | C.P.T. (min) | 80% conversion time (hr:min) | Mean rate of pressure drop (bar/hr) | Bulk density (gr/cm$^3$) | M.P.S. (μm) ( . . . ) = d95 | K-Value |
|---|---|---|---|---|---|---|---|---|---|---|
| None | H | — | 92.0 | 91.3 | 192 | 4:45 | 3.6 | 0.50 | 161 (216) | 62.2 |
| Perlauricacid | 11 | 0.250 | 92.7 | 91.6 | 180 | 4:30 | 3.4 | 0.42 | 163 (222) | 56.0 |
| Thioglycolate | I | 0.120 | 88.2 | 88.7 | 228 | 5:25 | 2.4 | 0.40 | 142 (194) | 57.1 |
| 2-Mercaptoethanol | J | 0.050 | 87.1 | 86.7 | 234 | 5:40 | 3.2 | 0.50 | 147 (202) | 55.3 |
| 2-Ethylhexanal | K | 0.250 | 90.6 | 88.6 | 210 | 5:10 | 3.6 | 0.49 | 147 (205) | 57.7 |

M.P.S. = Mean Particle Size

Table 2 clearly demonstrates the important advantage in reaction time that can be achieved using a preffered chain

TABLE 3

Influence of the use of different initiators applying Perlauricacid as CTA at a polymerization temperature of 62° C.

| Initiator + C.T.A. | Example number | conc. (%) | conc, A.O. (10$^{-2}$%) | conversion (by weight) (%) | conversion (%) | C.P.T. (min) | 80% conversion time (hr:min) | Mean rate of pressure-drop (bar/hr) | Bulk density (gr/cm$^3$) | M.P.S. (μm) ( . . . ) = d95 | K-value |
|---|---|---|---|---|---|---|---|---|---|---|---|
| Bis(3,5,5-trimethylhexanoyl)-peroxide + None | L | 0.200 | 1.018 | 92.0 | 91.3 | 192 | 4:45 | 3.6 | 0.50 | 161 (216) | 62.2 |
| Bis(3,5,5-trimethylhexanoyl)-peroxide + Perlauricacid | 12 | 0.200 0.250 | 1.018 1.852 | 92.9 | 91.6 | 180 | 4:30 | 3.4 | 0.42 | 163 (222) | 56.0 |
| t-butylperoxy-neodecanoate + none | M | 0.040 | 0.262 | 83.0 | 84.3 | 193 | 5:15 | 1.5 | 0.47 | 168 (229) | 62.3 |
| t-butylperoxy-neodecanoate + Perlauricacid | 13 | 0.040 0.250 | 0.262 1.852 | 88.8 | 88.6 | 177 | 4:30 | 2.5 | 0.40 | 162 (224) | 56.7 |
| Bis(4-tert-butyl-cyclohexyl)-peroxydicarbonate + none | N | 0.055 | 0.221 | 86.9 | 88.4 | 155 | 4:25 | 1.8 | 0.50 | 178 (249) | 61.9 |

TABLE 3-continued

Influence of the use of different initiators applying Perlauricacid as CTA at a polymerization temperature of 62° C.

| Initiator + C.T.A. | Example number | conc. (%) | conc, A.O. ($10^{-2}$%) | conversion (by weight) (%) | conversion (%) | C.P.T. (min) | 80% conversion time (hr:min) | Mean rate of pressure-drop (bar/hr) | Bulk density (gr/cm³) | M.P.S. (µm) ( . . . ) = d95 | K-value |
|---|---|---|---|---|---|---|---|---|---|---|---|
| Bis(4-tert-butyl-cyclohexyl)-peroxydicarbonate + Perlauricacid | 14 | 0.055 0.250 | 0.221 1.852 | 91.2 | 91.0 | 158 | 4:10 | 2.2 | 0.44 | 160 (226) | 56.7 |

A.O. = Active Oxygen
M.P.S. = Mean Particle Size

These experiments demonstrate that perlauric acid works well as a chain transfer agent with three different peroxidic initiators.

EXAMPLES 15–18 AND COMPARATIVE EXAMPLES O–R

The same procedure was used for these examples as for the previous examples except that both polymerization temperature and initiator were varied, demonstrating that the chain transfer agents of the present invention can be employed over a wide temperature range. The results are given in Table 4.

TABLE 4

Use of perlauric acid as CTA at various temperatures using different initiators

| Initiator + CTA | Example number | conc (%) | conc. A.O. ($10^{-2}$%) | Polymerization temperature | K-value |
|---|---|---|---|---|---|
| Bis(4-tert-butyl cyclohexyl)peroxy dicarbonate + none | O | 0.07 | 0.28 | 53.5 | 69.0 |
| Bis(4-tert-butyl cyclohexyl)peroxy dicarbonate + Perlauric acid | 15 | 0.07 0.25 | 0.28 1.85 | 53.5 | 61.3 |
| 2-Ethyl hexyl peroxy dicarbonate + none | P | 0.06 | 0.28 | 57.0 | 64.5 |
| 2-Ethyl hexyl peroxy dicarbonate + Perlauric acid | 16 | 0.06 0.25 | 0.28 1.85 | 57.0 | 58.7 |
| Bis(3,5,5-trimethyl hexanoyl)peroxide + none | Q | 0.20 | 1.02 | 62.0 | 62.2 |
| Bis(3,5,5-trimethyl hexanoyl)peroxide + Perlauric acid | 17 | 0.20 0.25 | 1.02 1.85 | 62.0 | 56.0 |
| Dilauroyl peroxide + none | R | 0.10 | 0.40 | 68.0 | 57.2 |
| Dilauroyl peroxide + perlauric acid | 18 | 0.10 0.25 | 0.40 1.85 | 68.0 | 53.4 |

The foregoing examples were presented for the purpose of illustration and description only and are not to be construed as limiting the invention in any way. The scope of the invention is to be determined from the claims appended hereto.

What is claimed is:

1. A method of radically (co)polymerizing at least one monomer selected from vinyl ester, vinyl halide, diene, acrylonitrile and α-olefin monomers, optionally with one or more ethylenically unsaturated monomers, which comprises the step of polymerizing said monomer with a polymerization initiator in the presence of an amount of at least one peroxyacid chain transfer agent effective to reduce the molecular weight of the (co)polymer in comparison to a (co)polymer made by the same process without chain transfer agent, said peroxyacid chain transfer agent used in the method of the present invention being selected from the group of compounds which contain a moiety of the formula I:

2. The method of claim 1 wherein said peroxyacid acid chain transfer agent is selected from the group represented by the following formulae:

wherein R is selected from the group consisting of H, $CH_3$, C(O)OOH, C(O)OH, C(O)OCH$_3$, C(O)OR, $C_2$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, wherein the alkyl groups may be linear or branched and wherein the alkyl, cycloalkyl, aryl, aralkyl and alkaryl are optionally substituted with one or more groups Y, wherein Y is a group selected from —C(O)OOH, hydroxy, alkoxy, aryloxy, epoxy, halogen, —C(O)OR$_1$, —OC(O)R$_1$, —C(O)OH, nitrile, nitro, —C(O)NR$_1$R$_2$, —C(O)NHR$_1$, —C(O)NH$_2$, —N(R$_1$)C(O)R$_2$, —SO$_2$NR$_1$R$_2$, —SO$_2$NHR$_1$, —SO$_2$NH$_2$, and —N(R$_1$)SO$_2$R$_2$; wherein R$_1$ and R$_2$ are independently selected from the group consisting of $C_2$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, wherein the alkyl groups may be linear or branched; and

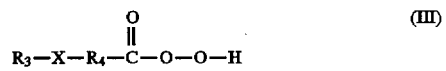

wherein R$_3$ is selected from the group consisting of, hydrogen, $C_1$–$C_{20}$ alkyl, $C_3$–$C_{20}$ cycloalkyl, $C_6$–$C_{20}$ aryl, $C_7$–$C_{20}$ aralkyl, $C_7$–$C_{20}$ alkaryl and imido-group containing radicals, wherein the alkyl groups may be linear or branched; R$_4$ is selected from $C_1$–$C_{20}$ alkylene, $C_2$–$C_{20}$ alkenylene, $C_6$–$C_{20}$ arylene, $C_7$–$C_{20}$ aralkylene, $C_7$–$C_{20}$ alkarylene, $C_3$–$C_{20}$ cycloalkylene and $C_3$–$C_{20}$ cycloalkenylene, wherein the alkylene and alkenylene groups may be linear or branched; and R$_3$ and/or R$_4$ are optionally substituted with one or more groups Y as defined above; and X is selected from a covalent bond, —SO$_2$—, —N(R$_5$)C(O)—, —C(O)N(R$_5$)—, —C(O)N[C(O)(R$_5$)]—, and —NHC(O)N(H)—; wherein $R_5$ is selected from the group consisting of $C_2$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, wherein the alkyl groups may be linear or branched and are optionally substituted with one or more groups Y as defined above; and $R_3$ and $R_5$ can combine to form a ring containing substituent selected from cycloalkyl, aryl, aralkyl or alkaryl, which ring is optionally substituted with one or more groups Y as defined above.

3. The method of claim 2 wherein in said chain transfer agent, R is selected from $C_3$–$C_{20}$ alkyl, $C_5$–$C_{20}$ cycloalkyl, $C_7$–$C_{20}$ aralkyl and $C_7$–$C_{20}$ alkaryl, wherein the alkyl groups may be linear or branched.

4. The method of claim 2 wherein in said chain transfer agent, $R_3$ is selected from an amido-group containing radical, X is nothing or sulfone and $R_4$ is selected from the group consisting of $C_1$–$C_{20}$ alkylene, $C_6$–$C_{20}$ arylene, $C_7$–$C_{20}$ aralkylene and $C_7$–$C_{20}$ alkarylene.

5. The method of claim 1 wherein said chain transfer agent is substantially oil-soluble.

6. The method of claim 1 wherein from 0.001 to 30 weight percent, based on the weight of the polymerizable monomer, of said peroxyacid chain transfer agent is employed.

7. The method of claim 6 wherein said monomer is vinyl chloride.

8. The method of claim 1 wherein said polymerization initiator is selected from the group consisting of azo initiators, peroxyesters, diacyl peroxides and peroxydicarbonates.

9. A (co)polymer produced by the method of claim 1.

10. A method for the radical polylmerization of one or more ethylenically unsaturated monomers which comprises polymerizing said monomer in the presence of at least one peroxyacid chain transfer agent, wherein the peroxyacid contains a moiety of the formula I:

* * * * *